United States Patent Office 2,958,605
Patented Nov. 1, 1960

2,958,605
ADHESIVE COMPOSITIONS
Howard H. Leiner, New Brunswick, and Charles P. West, Metuchen, N.J., assignors to Union Carbide Corporation, a corporation of New York
No Drawing. Filed July 22, 1958, Ser. No. 750,094
12 Claims. (Cl. 106—125)

This invention relates to adhesive compositions, and more particularly, to adhesive compositions containing animal glue as a major constituent.

Bonds obtainable with presently known animal glue compositions, although strong and tough under average exposure conditions, lack water resistance. Corrugated cardboard, furniture, grinding wheels, abrasive coatings, and other articles which are bonded with animal glue delaminate or otherwise deteriorate into an unusable condition upon immersion in water and, in some instances, on prolonged exposure to a highly humid environment due to a loss of strength by the moistened glue. The opposite extreme, an arid environment, causes animal glue to dry out and become brittle, and again lose bonding strength. Therefore, animal glues, despite the relative simplicity in processing and in use, are unsatisfactory as adhesives for many applications.

Methods for increasing the water resistance of animal glue generally employ tanning agents such as alums, ammonium or sodium bichromate, aluminum sulfate or aluminum formate, and most commonly, formaldehyde, used either per se or in a reversibly combined form such as paraformaldehyde or hexamethylenetetramine. It has been suggested that these tanning agents cross-link adjacent amino groups present in the animal glue, whereby the hydrophilic nature of the animal glue molecules is somewhat reduced and their tendency to absorb water is correspondingly decreased.

Treatment of animal glue with a tanning agent prior to its application to the surface to be bonded or coapplication of the animal glue and tanning agent on such surface solves few of the difficulties associated with the use of animal glue and even creates additional problems. For instance, the addition of a tanning agent to animal glue makes the pot life, or the time during which the animal glue is commercially usable, critical by reducing it to between 6 and 8 hours. Long setting times of the order of two weeks are required before the glue line develops an appreciable degree of cold water resistance. In addition, use of tanning agents does not confer any degree of resistance to boiling water and does not increase the dry bond strength.

It has also been suggested to use phenolic resins to improve the water resistance of animal glue. This type of treatment is not commercially useful, however, because addition of phenolic resins to animal glue causes immediate and irreversible gelation. Even if gelation is prevented by the use of gel depressants or liquefying agents such as urea, thiourea, calcium chloride, ammonium nitrate, or the like, the glue mixes obtained have too short and too unpredictable a pot life and exhibit too erratic cure characteristics to be commercially suitable. Moreover, the use of phenolic resins to modify animal glue does not increase to any significant extent the degree of water resistance normally exhibited by animal glue itself.

Animal glues are generally classified into about 18 grades according to their "gel strength." "Gel strength" of the glue is a number corresponding to the force in grams needed to drive a 0.5-inch diameter plunger a distance of 4 mm. into a gelled solution containing 12.5 percent glue solids which has been conditioned 16 to 18 hours to 10° C. The higher grade glues, i.e., those having the high gel strengths, provide the stronger bonds. These grades, however, can be prepared only by processes which are more complex than those required to produce the lower gel strength animal glues and are, therefore, more costly.

It is an object, therefore, of the present invention to provide adhesive compositions which possess all the advantages inherent in animal glue-containing compositions and which, when cured, provide water-proof bonds.

It is another object of our invention to provide adhesive compositions utilizing low gel strength animal glue which compare favorably in dry bond strength with high gel strength animal glue compositions and are water-proof as well.

According to the present invention, we have now discovered that these and other objects are accomplished by modifying animal glue with minor amounts of 2,4,6-trimethylolphenol or water soluble salts thereof. The modification of an animal glue with such trimethylolphenol compounds has been found to upgrade low gel strength animal glue to such an extent that the bond strength is unexpectedly equivalent to that obtained with a high gel strength animal glue. For example, the bond strength provided by a normally inferior 90-gram gel strength animal glue will, when said glue is modified with as little as 5 percent by weight of trimethylolphenol, be comparable in strength to that obtainable from much more costly 411-gram gel strength animal glue. In addition, we have also found that the trimethylolphenol-modified animal glue exhibits vastly superior water resistance over animal glues of any gel strength which have not been so modified.

Processing characteristics such as pot life, gel behavior, and curing characteristics of the trimethylolphenol-modified animal glues can be reliably and reproducibly controlled. Hence, they are highly satisfactory for commercial utilization for applications wherein unmodified animal glue has been heretofore employed. Setting of the compositions of our invention is rapid. Thus curing times are reduced and productivity is appreciably increased.

The term "animal glue" as used throughout the specification and the claims refers to a glue comprising natural proteins of animal origin. The proteins from which the glue can be formed are insoluble in all neutral solvents and are generally termed albuminoids or sclero-proteins and include such materials as elastins obtained from ligaments; keratins obtained from horns, hoofs, feathers, quills, and the like; and collagens obtained from hides, tendons, and bones.

Trimethylolphenol, as used herein, refers to 2,4,6-tris-(hydroxymethyl) phenol which is a white crystalline compound melting at about 84 to 85° C. In our invention trimethylolphenol can be incorporated into the animal glue while in the solid form, or for greater convenience, in the form of an aqueous or organic solution. A particularly satisfactory solution is an aqueous 70 percent trimethylolphenol solution such as can be obtained from the method described and claimed in U.S.P. 2,889,374 to C. Y. Meyers. This solution has a viscosity of about 50 to 70 centistokes at 25° C. and a pH of about 7 to 8.

The trimethylolphenol or trimethylolphenol salt content of our compositions ranges between about 2 to 50 parts by weight per 100 parts by weight of animal glue solids. Less than about 2 parts of trimethylolphenol generally does not effect any improvement of practical significance, whereas amounts greater than 50 parts of trimethylolphenol are difficult to incorporate into the animal glue and usually shorten excessively the pot life of the composition.

A water-soluble metal salt of trimethylolphenol, particularly an alkali metal or alkaline earth metal salt of trimethylolphenol such as sodium, calcium, or barium trimethylolphenate, and the like, can be used with the animal glue in place of or in addition to trimethylolphenol itself, if desired. The use of a salt of trimethylolphenol is sometimes economically and technologically advantageous in that such compounds are generally alkaline in nature and can be used to adjust the pH of the composition. Also, if a metal compound, particularly an alkaline earth metal compound, is normally added to the animal glue composition, as is sometimes done in adhesive applications to improve weather resistance, the addition of the corresponding alkaline earth metal trimethylolphenate supplies both the alkaline earth metal and the trimethylolphenol requirements of the composition.

An increase in both bond strength and water-resistance is effected in all animal glues modified with trimethylolphenol or its metal salts regardless of their gel strength, but the greatest economic benefit is realized in modification of low gel strength animal glues. High gel strength animal glues give stronger bonds than low gel strength glues under average conditions but are considerably more viscous and, therefore, more difficult to mix and apply than the low gel strength glues. They are also more costly, usually two or three times the cost of low gel strength glues and have little, if any, better resistance to water than the unmodified low gel strength glues. By modifying the low gel strength animal glues, we not only substantially equal the high gel strength glues in dry bond strength but also impart good water resistance to the bond. In addition, the low gel strength animal glue is easily mixed with the trimethylolphenol, and because it remains fluid for a considerable period, it is easily applied. Thus, all the advantages of easy handling and applying and rapid cure characteristics of low gel strength animal glues are retained, and heretofore unattained advantages of bond strength equivalent to high gel strength glues and both cold and boiling water resistance have been superadded thereto.

As with known animal glue compositions, our invention can contain a tanning agent, suitably in a concentration of about 0.1 to 1 percent; but the presence of tanning agents is not ordinarily required. Other modifiers and extenders such as are ordinarily incorporated in animal glue and similar adhesive compositions, e.g., calcium carbonate and silicates, can be incorporated in the compositions of our invention, if desired.

Pot life and gel behavior characteristics can be stabilized by appropriate pH control and/or by use of gel depressants such as urea, thiourea, dicyandiamide, and the other known gel depressants. Use of gel depressants, particularly thiourea, in the proper amounts prevents premature gelation of the trimethylolphenol-animal glue compositions and can provide adequate fluidity for periods exceeding two weeks. The optimum concentration of gel depressant depends primarily on the particular agent used and the ratio of trimethylolphenol to animal glue in the composition. The amount is not narrowly critical, but between 10 and 20 parts by weight of gel depressant per 100 parts by weight of glue solids are preferred for optimum results. A 90-gram gel strength animal glue modified with 25 parts by weight of trimethylolphenol and containing 20 parts by weight of thiourea per 100 parts by weight of glue solids has a pot life of more than 13 days.

The presence of gel depressants is particularly desirable where the pH of the trimethylolphenol-animal glue composition is in the range of 6 to about 12 and above in order to increase the pot life of these compositions to commercially suitable levels, i.e., fluidity for about one day at 70 to 80° F. Compositions having a pH of about 6 to 12 are preferred because they provide greater bond strength and superior water resistance. Trimethylolphenol-animal glue compositions having a pH between about 1 and 6 generally have a longer pot life than compositions having a higher pH and are highly suitable without use of a gel depressant, but their pot life can be increased by incorporation of a gel depressant.

It is important to note that the surprising and advantageous results obtained with animal glue modified with trimethylolphenol are not obtainable with phenolic compounds in animal glue generally. Even highly methylolated water-soluble phenol-formaldehyde resole resins which might appear to be similar to trimethylolphenol do not confer the advantages obtained with trimethylolphenol added per se or formed in situ from an alkali metal or alkaline earth metal trimethylolphenate.

We do not wish to be bound to any particular theory, but it is believed that the superiority of trimethylolphenol-modified animal glues over phenolic resin-modified animal glues is due, at least partially, to the absence of reactive ring hydrogens on the trimethylolphenol. Normally a methylol group, such as is present in both trimethylolphenol and resoles, will react with either (1) a reactive ring hydrogen, i.e., hydrogens located ortho and para to the phenolic hydroxyl, or (2) another methylol group, or (3) another reactive functional group present in the reaction system, e.g., a carboxyl or amino group. Reaction (1) proceeds at a much faster rate than reactions (2) or (3) and, therefore, while any appreciable quantity of reactive ring hydrogen remains, reaction (1) proceeds almost exclusively. This reaction acts to cross-link and immobilize the resin molecules. Consequently, reactions (2) and (3) take place, if at all, only ($a$) if there are enough methylol groups left therefor and ($b$) if the molecules in the system are sufficiently mobile that the methylol groups and the other reactant groups are able to approach each other closely enough to inter-react. Since trimethylolphenol contains no reactive ring hydrogens, the animal glue—probably through its amino groups—can compete successfully for the methylol groups (reaction (3)) against the methylol auto-condensation (reaction (2)). Therefore, a high degree of trimethylolphenol-animal glue inter-reaction can take place. Such inter-reaction occurs to only a small extent, if at all, in a reaction system which contains molecules having reactive ring hydrogens such as are always present in phenolic resoles; and it is probable that the product obtained in such a system is largely a mechanical mixture.

The following examples are illustrative of the practice of our invention. All parts and percentages are by weight unless otherwise stated.

The glue mixes were made in the following manner:

The total amount of water, W, needed to provide a mix containing 40 percent solids is first calculated. For this purpose animal glue powder, trimethylolphenol, and gel depressant are regarded as solids. W is set equal to the sum of $w + w_s + A$, where $w_s$ is the water present in the 70 percent 2,4,6-trimethylolphenol aqueous solution, $w$ is the water added per se, and A is the pH adjusting agent. Adjustments of pH values, if any were made with a dilute aqueous solution containing, usually, about 10 percent of an acidic or alkaline agent. Since the quantity used was relatively small, the entire solution is regarded as water for purposes of solids content calculation.

The gel depressant, if any, is dissolved in an amount of water equal to about 95 percent of $w$. The container and contents are heated to 160 to 180° F. on a hot water bath and the glue added slowly, with agitation, while maintaining the mixture at about 160 to 180° F. Agitation is continued until a smooth, uniform mixture is obtained. During this period, about 15 to 20 minutes, water is added as necessary to compensate for evaporation loss. The mixture is then cooled to room temperature and set aside overnight, without agitation. The pH is adjusted to the desired level by careful addition of dilute acid or base. Mixtures containing animal glue and trimethylolphenol, with or without a gel depressant, normally have a pH of about 7.3. Consequently, compositions which are intended to have such a pH receive no pH adjustment at this point. Compositions intended to have a pH in the acid region are conveniently adjusted with a 10 percent phosphoric acid solution. No significant difference in properties was discerned, however, when other acids, e.g., sulfuric, hydrochloric, acetic, etc., or acid salts or other acid reacting materials were used, provided that the final composition was brought to the same pH.

The trimethylolphenol solution is added slowly with agitation and generally causes a rise in the pH of an acidic glue mixture of about 0.3 to 0.5 of a pH unit. The pH is readjusted to the desired point if necessary and water added as required to bring the solids content to 40 percent.

As used in the examples and tables below, the terms "percent gel depressant" and "percent trimethylolphenol" denote the parts by weight of gel depressant and trimethylolphenol, respectively, per 100 parts animal glue solids.

For example, a composition consisting of

| | grams |
|---|---|
| Animal glue powder | 100 |
| Thiourea | 10 |
| Trimethylolphenol | 20 |
| Water (from all sources) | 195 | contains 10 percent thiourea and 20 percent trimethylolphenol, but 40 percent solids.

EXAMPLE I

Ninety-gram gel strength hide glue/trimethylolphenol mixtures whose compositions and pH are shown in Table I below were prepared as described above. The bond strengths provided by each composition were then determined in the following manner:

Two 1.5 inch by 4.5 inch strips of birch wood veneer were coated on one face each with the adhesive composition, allowed to air dry about 3 minutes, and then bonded together in a press for 4 minutes at 325° F. and 175 p.s.i. pressure. The bonded strip was cooled and trimmed to 1 inch by 4 inches, then machined out and tested as prescribed in Federal Test Method Standard No. 175, dated November 30, 1956, "Adhesives: Methods of Testing," Method No. 1032.1–T. Before testing, each specimen was pre-conditioned as follows: (A) for "dry" bond strength; kept one week at 50 percent relative humidity at room temperature: (B) for "wet" bond strength; kept one week at atmospheric conditions, i.e., ambient laboratory temperature and humidity, followed by 24-hour immersion in water at room temperature: (C) for "boiling water" bond strength; kept one week at atmospheric conditions followed by 3-hour immersion in boiling water. Five speciments were used for each test. Their average values appear in Table I.

For purposes of comparison with presently available commercial animal glue adhesives, two unmodified mixtures containing, respectively, a 222-gram and 411-gram gel strength hide glue were prepared and tested in the same manner. These results are also given in Table I.

*Table I.—Bond strength (p.s.i.)* [1]

| Gel Depressant: | | I | | | II | | | III | | | IV | | |
|---|---|---|---|---|---|---|---|---|---|---|---|---|---|
| Dicyandiamide | | 10% | | | 10% | | | 20% | | | | | |
| Thiourea | | | | | | | | | | | 20% | | |
| | | (pH=4) | | | (pH=7.3) | | | (pH=7.3) | | | (pH=7.3) | | |
| No. | Tri-methylol-phenol, percent | A | B | C | A | B | C | A | B | C | A | B | C |
| 1 | 0 | 290 | 0 | 0 | 432 | 73 | 0 | | | | | | |
| 2 | 5 | 332 | 46 | 0 | 584 | 141 | 128 | 495 | 140 | 58 | | | |
| 3 | 10 | 397 | 100 | 0 | 557 | 212 | 196 | 557 | 166 | 115 | 416 | 355 | 138 |
| 4 | 25 | 372 | 168 | 28 | | | | | | | 423 | 435 | 230 |
| 5 | 50 | 416 | 362 | 282 | | | | | | | | | |

| For Comparison | A | B | C |
|---|---|---|---|
| Unmodified 222 gel strength glue at pH 7 | 323 | 0 | 0 |
| Unmodified 411 gel strength glue at pH 7 | 443 | 53 | 0 |

[1] Average value for 5 specimens: A, dry strength. B, after 24-hour immersion in cold water. C, after 3-hour immersion in boiling water.

From the foregoing results, it can readily be seen that modification of an animal glue with trimethylolphenol vastly improves the "A" dry, "B" wet, and "C" boiling water bond strengths and that said improvements become progressively greater with increasing trimethylolphenol content. Also greater bond strengths are obtained with a trimethylolphenol-animal glue composition in neutral medium (pH=7.3) than in acid medium (pH=4.0). Also, dicyandiamide gives better dry strength bonds than thiourea.

Thiourea, also, gives bonds of comparatively greater water resistance than dicyandiamide at a given concentration of trimethylolphenol. The trimethylolphenol-low gel strength animal glue compositions are comparable to the high gel strength glues in dry bond strength and exhibit vastly greater strength after exposure to water.

EXAMPLE II

Compositions containing 100 parts of 90-gram, 222-gram and 411-gram gel strength hide glue, respectively, together with 20 parts thiourea and the number of parts trimethylolphenol shown in Table II below were prepared, in neutral medium, i.e., with no pH adjustment, by the previously described procedure. Wood strips were then bonded with said compositions and tested for wet bond strengths, as in the previous example, except that the assemblies were not cured in a press but were clamped between rigid steel plates with C clamps and cured in a circulating air oven at 175° F. for 16 hours.

*Table II*

| Composition | | Bond Strength [1] (p.s.i.) | |
|---|---|---|---|
| Glue | Trimethylol-phenol, percent | After 24-hr. immersion in cold water | After 3-hr. immersion in boiling water |
| gm. gel strength: | | | |
| 222 | 0 | 76 | 0 |
| 411 | 0 | 0 | 0 |
| 90 | 0 | 0 | 0 |
| 90 | 5 | 119 | 51 |
| 90 | 10 | 189 | 82 |

[1] Average of 5 specimens—all specimens preconditioned one week under ambient atmospheric conditions prior to indicated immersion.

The above results further illustrate the superiority of the trimethylolphenol/low (90 gram) gel strength animal glue compositions of this invention over the high (222 gram and 411 gram) gel strength animal glues which have not been modified.

EXAMPLE III

Compositions and procedure were as in Example II, except that the assemblies were cured in a press at 175° F. and 175 p.s.i. pressure for 1 and 3-hour periods.

*Table III*

| Glue | Percent Trimethylol-phenol | Dry Bond Strength [1] (p.s.i.) | |
|---|---|---|---|
| | | 1-hr. cure | 3-hr. cure |
| gm. gel strength: | | | |
| 222 | 0 | ([2]) | 253 |
| 411 | 0 | 310 | 401 |
| 90 | 0 | ([2]) | 230 |
| 90 | 5 | 325 | 444 |

[1] Average of 5 specimens—specimens preconditioned one week at 50 percent relative humidity at room temperature.
[2] No adhesion.

It can be seen from the above results that a trimethylolphenol-modified animal glue composition cures much faster than a conventional animal glue mix, and that the bond strength of a trimethylolphenol/low gel strength glue combination is fully comparable to that provided by an unmodified high gel strength grade animal glue.

EXAMPLE IV

The above-described procedure was used to prepare a number of 90-gram gel strength hide glue/trimethylolphenol mixtures whose composition and pH are shown in Table IV below. Each mixture was then stored for 13 days at room temperature, during which time its viscosity was measured periodically. The pot life of each mixture, i.e., the number of days during which its Gardner-Holdt viscosity remained below $Z_2$, is also shown in Table IV.

*Table IV.—Pot life (days) at room temperature*

| Gel Depressant: | | | | | | | | |
|---|---|---|---|---|---|---|---|---|
| Dicyandiamide | | | 10% | | 20% | | | |
| Thiourea | | | | | | | 20% | |
| pH | | 4.0 | 7.3 | 4.0 | 7.3 | 4.0 | 7.3 | 4.0 | 7.3 |
| No. | Tri-methylol-phenol, percent | | | | | | | | |
| 1 | 0 | 13+ | 13+ | 13+ | 13+ | 13+ | 13+ | 13+ | 13+ |
| 2 | 5 | | | 13+ | <1 | 13+ | <1 | 13+ | 13+ |
| 3 | 10 | 1.5 | | 13+ | <1 | 13+ | <1 | 13+ | 13+ |
| 4 | 25 | | | 13+ | <1 | 13+ | <1 | 13+ | 13+ |
| 5 | 50 | | | 2 | | 13+ | | | |

It can be seen from the foregoing that the compositions have better pot life in acidic (pH=4.0) environment than in neutral (pH=7.3) environment. In addition, it is also seen that thiourea provides better pot life than dicyandiamide and that increasing trimethylolphenol concentration tends to reduce pot life quite significantly at 50 parts by weight of trimethylolphenol.

EXAMPLE V

The three compositions A, B, and C were prepared by the above-described procedure. Composition A was made with no preliminary pH adjustments, then divided into four parts and each part adjusted with 40 percent aqueous NaOH solution to the indicated pH. Compositions B and C were made directly to the indicated pH. The water resistance of each composition was tested in the following manner. The composition was drawn into a thin film and cured for one hour in a 225° F. oven. A carefully weighed portion of this film was shaken in water for 24 hours; the mixture was filtered; the filtrate evaporated to dryness; and the residue weighed. The following results which indicate the degree of water resistance of the various compositions were obtained:

*Table V*

| Composition | A | | | | B | C |
|---|---|---|---|---|---|---|
| 90-gm. gel strength glue | 100 | | | | 100 | 100 |
| Trimethylolphenol | 10 | | | | 10 | 25 |
| Thiourea | 20 | | | | 20 | 20 |
| Water | 196 | | | | 196 | 217 |
| pH | 9.0 | 10.0 | 11.0 | 11.5 | 4.0 | 4.0 |
| Percent Water Solubles | 23 | 24 | 18 | 18 | 48 | 23 |

It can be seen from the results given in Table V that water resistance is (i) relatively insensitive to pH in the alkaline region (cf. A); (ii) better in alkaline medium than in acidic medium (cf. A and B); and (iii) better with higher trimethylolphenol content (cf. C). In contrast to these results, animal glue compositions containing no trimethylolphenol when tested in similar fashion, show about 80 to 100 percent water solubles, depending on the particular type and grade of glue, gel depressant, and pH as seen in Table V-A below.

*Table V-A*

| Composition | A | B | C |
|---|---|---|---|
| 90-gm. gel strength glue | 100 | | 100 |
| 401-gm. gel strength glue | | 100 | |
| Thiourea | 20 | 20 | |
| pH | 4 | 4 | 4 |
| Percent Water Solubles | 79 | 100 | 100 |

EXAMPLE VI

A mixture consisting of 80 grams animal glue, 16 grams thiourea, 153 grams water, and 0.8 gram formalin (40 percent $CH_2O$ content) was heated at 150° F. for 0.5, 0.75, and 1 hour, at each of which times aliquot portions were withdrawn and 10 percent by weight trimethylolphenol, based on glue solids, was added. Bonded specimens made from each had about the same dry strength as those made from a control composition containing no formalin. When the experiment was repeated with the initial reactant mixture adjusted to (a) pH 10, with sodium hydroxide, and (b) pH 4, with phosphoric acid, substantially similar results were obtained.

EXAMPLE VII

A mix containing 80 grams of 90 gel strength hide glue, 16 grams thiourea, and 150 grams water was prepared in the manner of Examples I–V, then modified with 11.4 grams of a 70 percent aqueous trimethylolphenol solution in the following manner. One-fifth of the trimethylolphenol was added to the glue mix, which was then "cooked" at 180° F. for 1.5 hours, after which the remainder of the trimethylolphenol was stirred in. Strips were bonded with this composition and tested in the usual manner. The bonds had a dry strength of 625 p.s.i., but their wet strengths were poor.

The compositions of our invention are useful not only for those applications for which animal glues have been employed heretofore but also for many new applications such as paper size, coating compositions, set-up wheels, coated abrasives, and the like wherein a waterproof bond is desirable.

What is claimed is:

1. An adhesive composition comprising animal glue and per 100 parts by weight animal glue solids at least about two parts by weight of a member selected from the group consisting of 2,4,6-trimethylolphenol, alkali metal salts of 2,4,6-trimethylolphenol and alkaline earth metal salts of 2,4,6-trimethylolphenol.

2. An adhesive composition comprising animal glue and from about 2 to about 50 parts by weight of a member selected from the group consisting of 2,4,6-trimethylolphenol, alkali metal salts of 2,4,6-trimethylolphenol and alkaline earth metal salts of 2,4,6-trimethylphenol per 100 parts by weight of animal glue solids.

3. An adhesive composition comprising animal glue and from about 2 to about 50 parts by weight of a member selected from the group consisting of 2,4,6-trimethylolphenol, alkali metal salts of 2,4,6-trimethylolphenol and alkaline earth metal salts of 2,4,6-trimethylolphenol per 100 parts by weight of animal glue solids, said composition having a pH between about 1 and about 12.

4. An adhesive composition comprising animal glue and from about 2 to about 50 parts by weight of a member selected from the group consisting of 2,4,6-trimethylolphenol, alkali metal salts of 2,4,6-trimethylolphenol and alkaline earth metal salts of 2,4,6-trimethylolphenol and 10 to 20 parts by weight of gel depressant per 100 parts by weight of animal glue solids.

5. The composition of claim 4 wherein the pH of the composition is between 6 and 12.

6. An adhesive composition comprising low gel strength animal glue, 2 to 50 parts by weight of 2,4,6-trimethylolphenol, and 10 to 20 parts by weight of gel depressant per 100 parts by weight of animal glue solids.

7. A composition comprising animal glue and a minor amount comprising, at least about 2 parts by weight of 2,4,6-trimethylolphenol per 100 parts by weight of animal glue solids.

8. A composition comprising 100 parts by weight of low gel strength animal glue and 2 to 50 parts by weight of 2,4,6-trimethylolphenol.

9. A water resistant bond comprising a reacted mixture of animal glue and from 2 to 50 parts by weight of a member selected from the group consisting of 2,4,6-trimethylolphenol, alkali metal salts of 2,4,6-trimethylolphenol and alkaline earth metal salts of 2,4,6-trimethylolphenol per 100 parts by weight of animal glue solids.

10. An adhesive composition comprising low gel strength glue, 2 to 50 parts by weight of a water soluble alkali metal salt of 2,4,6-trimethylolphenol and 10 to 20 parts by weight of a gel depressant per 100 parts by weight of animal glue solids.

11. An adhesive composition comprising low gel strength animal glue, 2 to 50 parts by weight of a water soluble alkali metal salt of 2,4,6-trimethylolphenol and 10 to 20 parts by weight of a gel depressant per 100 parts by weight of animal glue solids.

12. A blend of powdered animal glue and 2 to 50 parts by weight of an alkaline earth metal salt of 2,4,6-trimethylolphenol per 100 parts by weight of animal glue solids, said blend upon dissolution in water being heat reactive to form a water resistant bond.

References Cited in the file of this patent
UNITED STATES PATENTS

| | | |
|---|---|---|
| 1,394,654 | Tressler | Oct. 25, 1921 |
| 1,833,772 | Bradshaw | Nov. 24, 1931 |
| 2,579,329 | Martin | Dec. 18, 1951 |
| 2,889,374 | Meyers | June 2, 1959 |

UNITED STATES PATENT OFFICE
CERTIFICATION OF CORRECTION

Patent No. 2,958,605  November 1, 1960

Howard H. Leiner et al.

It is hereby certified that error appears in the above numbered patent requiring correction and that the said Letters Patent should read as corrected below.

Column 9, line 28, after "comprising" strike out the comma; column 10, line 10, after "strength" insert -- animal --; line 16, for "alkali" read -- alkaline earth --.

Signed and sealed this 25th day of April 1961.

(SEAL)
Attest:

ERNEST W. SWIDER
Attesting Officer

DAVID L. LADD
Commissioner of Patents